(12) United States Patent
Wilson

(10) Patent No.: US 7,004,706 B1
(45) Date of Patent: Feb. 28, 2006

(54) HAY BALE LOADER AND HAULER

(76) Inventor: Gary W. Wilson, 4183 Greenville Rd., Elkton, KY (US) 42220

( * ) Notice: Subject to any disclaimer, the term of this patent is extended or adjusted under 35 U.S.C. 154(b) by 338 days.

(21) Appl. No.: 10/260,632

(22) Filed: Sep. 30, 2002

Related U.S. Application Data

(60) Provisional application No. 60/326,246, filed on Oct. 1, 2001, provisional application No. 60/357,274, filed on Feb. 15, 2002.

(51) Int. Cl.
A01D 87/12 (2006.01)

(52) U.S. Cl. .................. 414/111; 414/24.5; 414/502

(58) Field of Classification Search ........... 414/24.5, 414/111, 501–503, 789.7; 294/120, 61
See application file for complete search history.

(56) References Cited

U.S. PATENT DOCUMENTS

| | | | |
|---|---|---|---|
| 4,043,461 A * | 8/1977 | Castro ............... 198/374 |
| 4,076,138 A | 2/1978 | Honomichl, Sr. |
| 4,101,081 A * | 7/1978 | Ritter et al. ........ 241/101.74 |
| 4,117,940 A | 10/1978 | Adam |
| 4,182,590 A | 1/1980 | Harkness |
| 4,249,842 A | 2/1981 | Johnson |
| 4,329,101 A | 5/1982 | Green et al. |
| 4,329,102 A | 5/1982 | Gray |
| 4,376,607 A | 3/1983 | Gibson |
| 4,441,845 A * | 4/1984 | Gibson ............... 414/24.6 |
| 4,498,829 A * | 2/1985 | Spikes ............... 414/24.5 |
| 4,909,694 A | 3/1990 | Peters et al. |
| 5,062,757 A | 11/1991 | Eichenauer |
| 5,333,981 A | 8/1994 | Pronovost |
| 5,340,259 A | 8/1994 | Flaskey |
| 5,405,229 A * | 4/1995 | Tilley et al. ........ 414/111 |
| 5,618,146 A | 4/1997 | Cooper |
| 5,630,689 A | 5/1997 | Willis |
| 5,639,199 A | 6/1997 | Connell, Jr. |
| 5,651,653 A | 7/1997 | Bablo |
| 5,664,923 A | 9/1997 | Olin |
| 5,690,461 A * | 11/1997 | Tilley ............... 414/111 |
| 5,769,587 A | 6/1998 | Gilfoil et al. |
| 6,019,562 A | 2/2000 | Cheatham |
| 6,106,209 A | 8/2000 | Krenek |
| 6,312,205 B1 * | 11/2001 | Vandenberg ........ 414/24.5 |

* cited by examiner

Primary Examiner—Dean J. Kramer
(74) Attorney, Agent, or Firm—Waddey & Patterson, P.C.; Phillip E. Walker

(57) ABSTRACT

The present invention provides an apparatus for loading, transporting, and unloading hay bales. This apparatus comprises a trailer frame including a first side and length, a conveyor device attached to the trailer frame, a loading system attached to the first side of the trailer frame, and a hay bale retrieving device pivotally attached to the loading system. The conveyor device is positioned to transport the hay bales the majority of the length of the trailer frame, while the loading system includes a movement deck and a movement arm positioned to move the hay bales across the movement deck and to the trailer frame. The hay bale retrieving device is positioned to transport the hay bales to the movement deck and includes a first spike and a second spike positioned to oppose the first spike. A first position is attached to the first spike and a second position is attached to the second spike. The first and second pistons are positioned to removably impale the first and second spikes onto the hay bales.

19 Claims, 15 Drawing Sheets

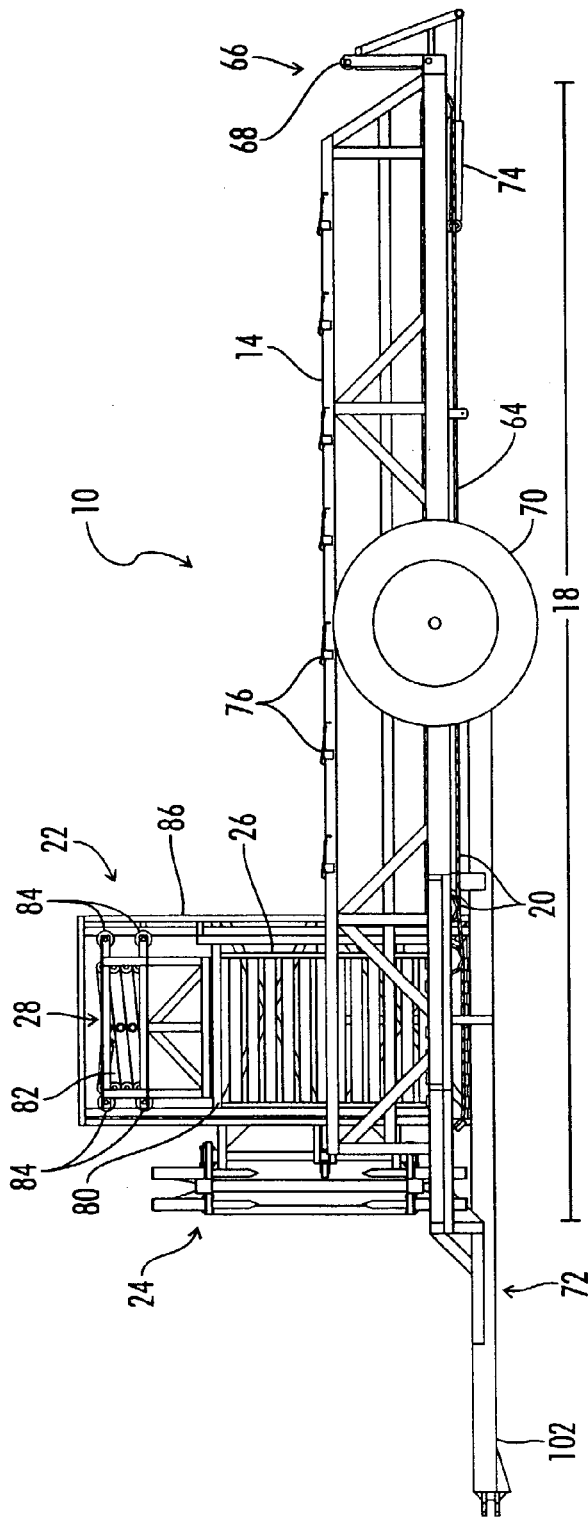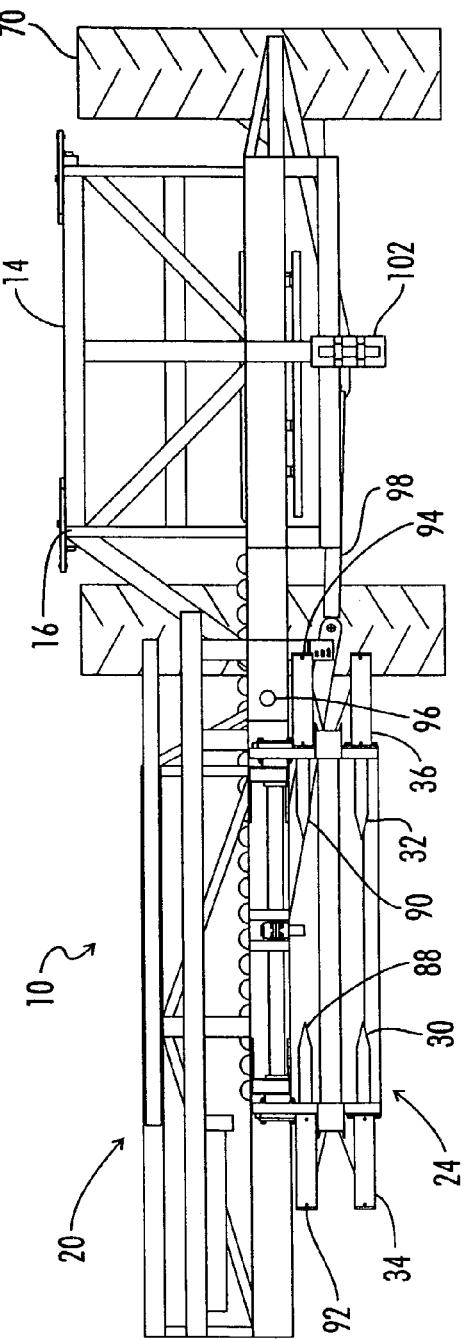

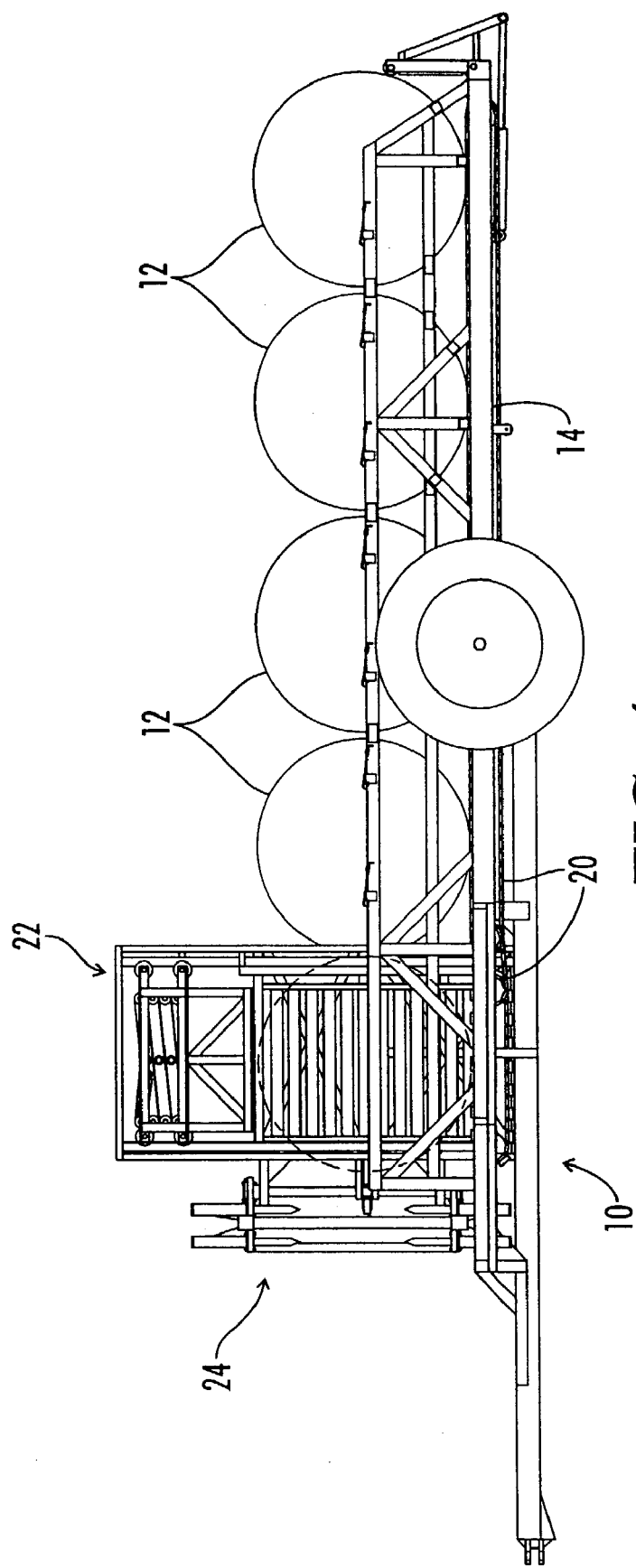

HAY BALE LOADER AND HAULER

This application claims the benefit of now abandoned U.S. Provisional Patent Application Ser. No. 60/326,246 filed Oct. 1, 2001, entitled "Hay Bale Loader and Hauler," and now abandoned U.S. Patent Ser. No. 60/357,274 filed Feb. 15, 2002, entitled "Hay Bale Loader and Hauler." Both applications are hereby incorporated by reference.

Be it known that I, Gary W. Wilson, a citizen of the United States, residing at 4183 Greenville Road, Elkton, Ky. 42220; have invented a new and useful "Hay Bale Loader and Hauler."

FIELD OF THE INVENTION

This invention relates to the field of agricultural equipment, and more particularly to an apparatus to handle, retrieve, transport, and unload large bales of agricultural material, particularly, but without limitation, round bales of hay.

BACKGROUND OF THE INVENTION

It is common practice to transport hay and other agricultural products as needed from one location to another as needed. Hay is usually baled into large bales that can weigh several hundred pounds. A bale can have a cylindrical or rectangular geometry and can weigh between fifteen hundred to three thousand pounds. Obviously, the task of moving these enormous bales is outside the realm of pure manual labor. Therefore, an apparatus to retrieve, transport, and unload these enormous bales is required.

Several bale loaders are known in the prior art. For example, U.S. Pat. Nos. 4,076,138, 4,249,842, and 4,329,102 disclose various types of round bale loaders and carriers. However, these prior art carriers have loading devices used to scoop the hay bale off the ground and load it into a trailer type structure. This scooping motion can run into difficulty when the hay bales are not on level ground or if the hay bales do not exactly match the dimensions required to perfectly fit into the loading devices of these prior art carriers.

Other prior art hay bale carriers have attempted to overcome these shortcomings but have yet to adequately and efficiently load, unload, and haul hay bales. For example, U.S. Pat. No. 5,240,259 requires the trailer apparatus to be perfectly positioned beside the hay bale as an upper frame assembly surrounds the hay bale before attempting to lift the hay bale onto the trailer. This perfect positioning requirement is slow and inefficient in the loading of hay bales onto a trailer.

Also, U.S. Pat. No. 6,019,562 attempts to clamp hay bales between gripping arms in order to lift the hay bales onto a trailer. During the course of this clamping the hay bales can slide or fall out of the gripping arms, therefore complicating the loading process.

Thus there is a need in the art for an apparatus to handle, retrieve, transport, and unload large bales of agricultural material.

SUMMARY OF THE INVENTION

The present invention provides an apparatus for loading, transporting, and unloading hay bales. This apparatus comprises a trailer frame including a first side and length, a conveyor device attached to the trailer frame, a loading system attached to the first side of the trailer frame, and a hay bale retrieving device pivotally attached to the loading system. The conveyor device is positioned to transport the hay bales the majority of the length of the trailer frame, while the loading system includes a movement deck and a movement arm positioned to move the hay bales across the movement deck and to the trailer frame. The hay bale retrieving device is positioned to transport the hay bales to the movement deck and includes a first spike and a second spike positioned to oppose the first spike. A first position is attached to the first spike and a second position is attached to the second spike. The first and second pistons are positioned to removably impale the first and second spikes onto the hay bales.

A vehicle for loading, transporting, and unloading hay bales is also disclosed. The vehicle comprises a vehicle frame including a loading end and a length, an engine attached to the vehicle frame, a conveyor device attached to the vehicle frame and positioned to transport the hay bales the majority of the length of the vehicle frame, and a hay bale retrieving device pivotally attached to the loading end. The hay bale retrieving device includes a first spike and second spike positioned to oppose the first spike, both spikes positioned to engage the hay bales and lift the hay bales onto the frame. The vehicle is a self-contained unit designed to load, transport, and unload the hay bales without the need for an independent drive mechanism.

It is therefore the general object of the present invention to provide an apparatus for retrieving, transporting, and unloading hay bales.

Another object of the present invention is to provide a vehicle for loading, transporting, and unloading hay bales.

Still another object of the present invention is to provide an apparatus that removably impales hay bales in order to load hay bales onto a frame.

Yet another object of the present invention is to provide an apparatus that has increased storage capacities for hay bales.

Still yet another object of the present invention is to provide an apparatus that has multiple level storage capacity used to load, transport, and unload hay bales.

Another object of the present invention is to provide an apparatus capable of turning hay bales to desired orientations once the hay bales are loaded onto the apparatus in order to increase the loading capacity and the transport characteristics of the apparatus.

Other further objects, features, and advantages of the present invention will be readily apparent to those skilled in the art upon a reading of the following disclosure when taken in conjunction with the accompanying drawings.

BRIEF DESCRIPTION OF THE DRAWINGS

FIG. 2 is a side view of the apparatus of the present invention with the loading system and hay bale retrieving device raised to the transport position.

FIG. 3 is a front view of the apparatus of the present invention.

FIG. 4 is a side view of the apparatus of the present invention shown with hay bales loaded onto the trailer frame.

FIG. 6 shows a continuation of the raising of the loading system and the hay bale retrieving device.

FIG. 7 shows the complete transformation of the loading system and the hay bale retrieving device into the transport position.

FIG. 9 shows the hay bale retrieving device commencing the upward rotation towards the movement deck of the loading system.

FIG. 10 shows the completed rotation of the hay bale retrieving device to the movement deck.

FIG. 12 shows the rotational transfer platform commencing its rotational turn.

FIG. 13 shows the rotational transfer platform completing a 90-degree turn in order to offload a hay bale to the receiving frame the conveyor device.

FIG. 14 shows both a top and bottom view of the rotational transfer platform.

FIG. 16 shows the rotational transfer platform after it has completed a 90-degree turn in order to facilitate transfer of the hay bale onto the conveyor device.

FIG. 17 shows the push cylinder commencing engagement of the hay bale and transferring the hay bale to the receiving frame and the conveyor device.

FIG. 18 shows the push cylinder completing the extension of the rod and fully moving the hay bale onto the receiving frame and the conveyor device.

FIG. 19 shows the first hay bale being indexed backwards on the conveyor device and a second hay bale moving onto the rotational platform. FIG. 19 also shows the push cylinder fully retracted.

FIG. 23 shows the lifting system raising the top front gate and inserting a hay bale onto the top trailer frame.

FIG. 24 shows hay bales being unloaded off the base trailer frame.

FIG. 25 shows the unloading of the hay bales from the top trailer frame.

DESCRIPTION OF THE PREFERRED EMBODIMENTS

Figure 1:
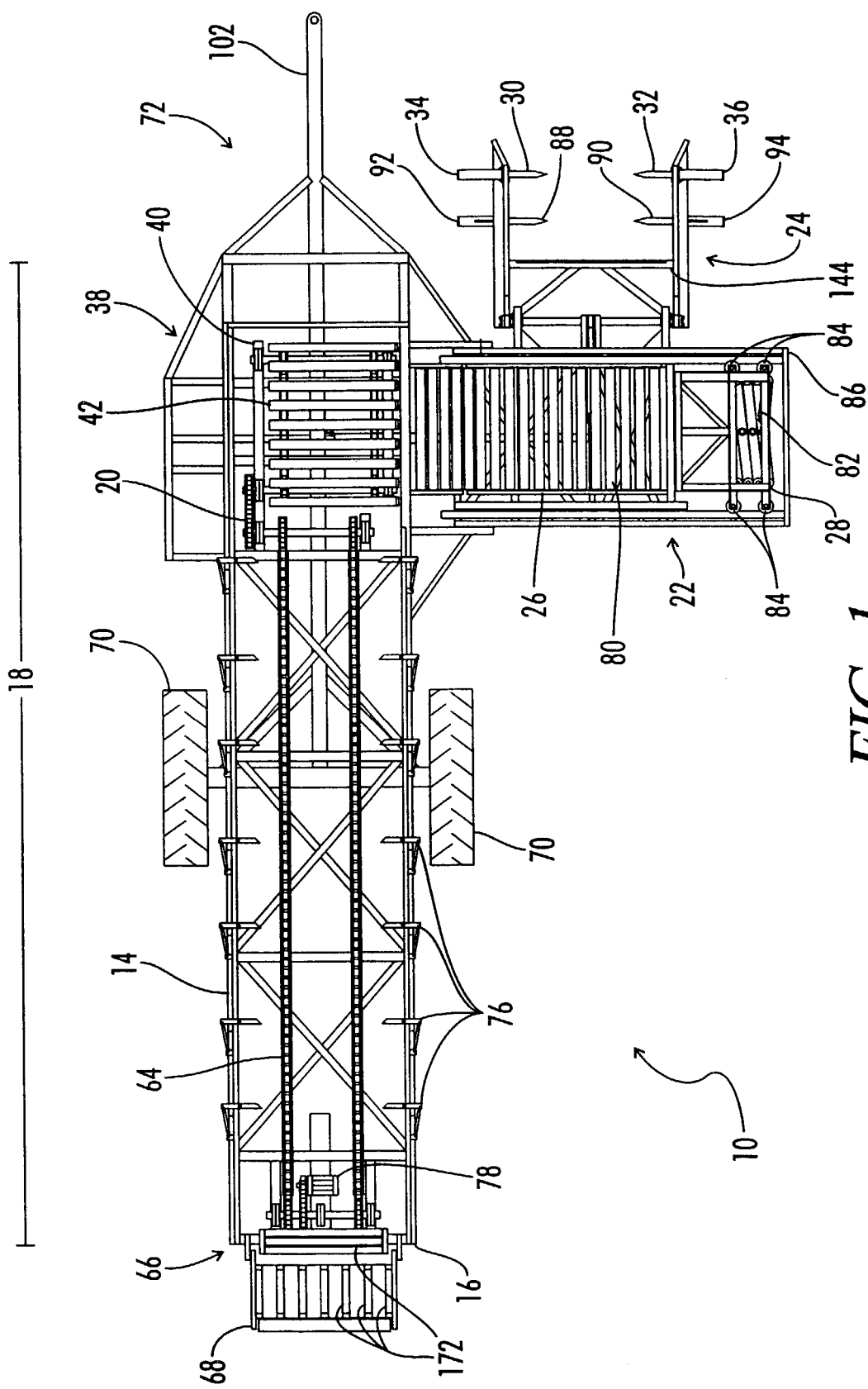
FIG. 1 shows a top view of one embodiment of the apparatus of the current invention.

Referring now to FIG. 1, the apparatus of the present invention shown is generally designated by the numeral 10. The apparatus 10 is for loading, transporting, and unloading hay bales 12. The apparatus 10 comprises a trailer frame 14 including a first side 16 and a length 18, a conveyor device 20 attached to the trailer frame 14, a loading system 22 attached to the first side 16 of the trailer frame 14, and a hay bale retrieving device 24 pivotally attached to the loading system 22. The conveyor device 20 is positioned on the trailer frame 14 to transport the hay bales 12 the majority of the length 18 of the trailer frame 14. The loading system 22, also known as a loading arm frame 22 or a loading frame roller deck 22, includes a movement deck 26 and a movement arm 28 positioned to move the hay bales 12 across the movement deck 26 into the trailer frame 14. The hay bale retrieving device 24 is positioned to transport hay bales 12 to the movement deck 26. The hay bale retrieving device 24 includes a first spike 30 and a second spike 32 positioned on the retrieving device 24 opposed to the first spike 30. Also included is a first piston 34 attached to the first spike 30 and a second piston 36 attached to the second spike 32, wherein the first and second pistons 34 and 36 are positioned to removably impale the first and second spikes 30 and 32 into the hay bales 12.

In a preferred embodiment, the trailer frame 14 includes a loading end 38 and a transfer platform 40 located near the loading end 38. The transfer platform 40 includes a carrier track 42 positioned to transfer the hay bales 12 to the conveyor device 20. The carrier track 42 can be numerous conveyor type tracks known in the industry to transport materials from one location to the next, including, but not limited to, a slat conveyor, a chain conveyor, a roller conveyor, or other conveyor types and still maintain the inventive spirit of this invention.

The transfer platform 40, which can also be called a rotating wheel mechanism 40, a rotating frame 40, or a receiving wheel 40, is designed to accept the hay bales 12 from the movement deck 26 of the loading system 22 and transition the hay bales 12 to the conveyor device 20. In one embodiment, the transfer platform 40 further includes a plurality of rotational devices 44 engaging the trailer frame 14 and positioned to rotate the transfer platform 40 relative to the trailer frame 14. Through the use of the rotational devices 44, the transfer platform 40 has the capability of rotating in a preferred range of 0 to 180 degrees and a most preferred range from 0 to 90 degrees, where the zero degree measurement is taken to be perpendicular to the first side 16 of the trailer frame 14.

Figure 11:
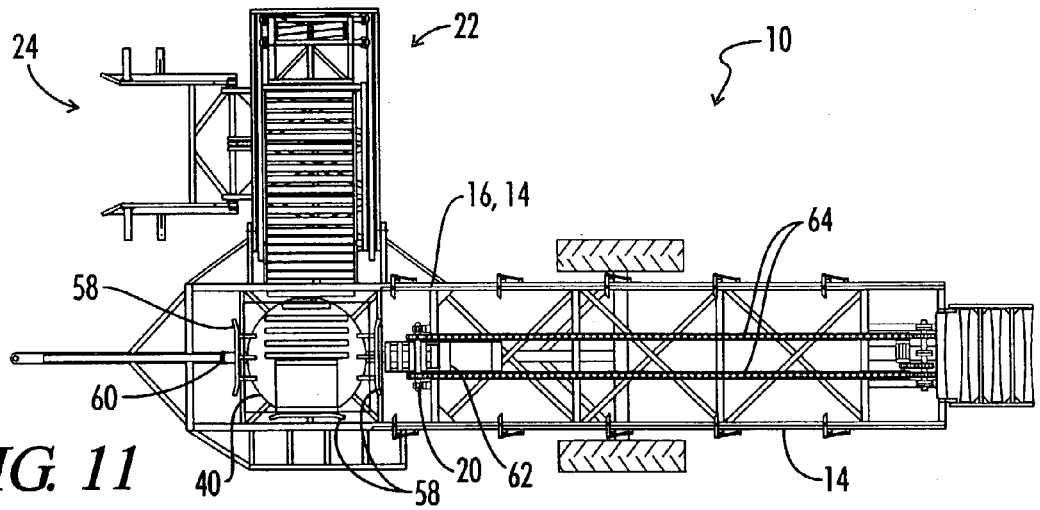
FIG. 11 is a top view of an apparatus of the current invention shown including the rotational transfer platform.
Figure 12:
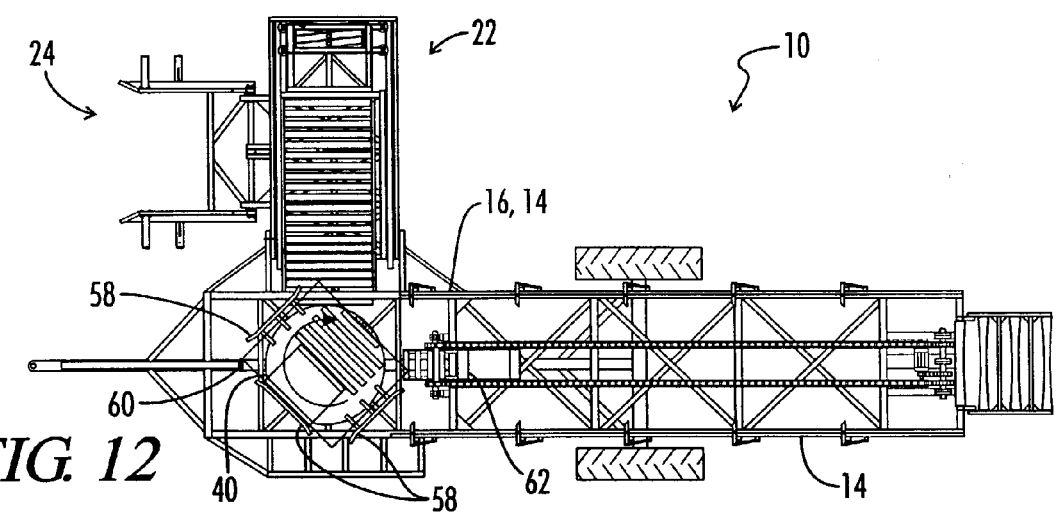
FIG. 12 is a top view similar to FIG. 11.
Figure 13:
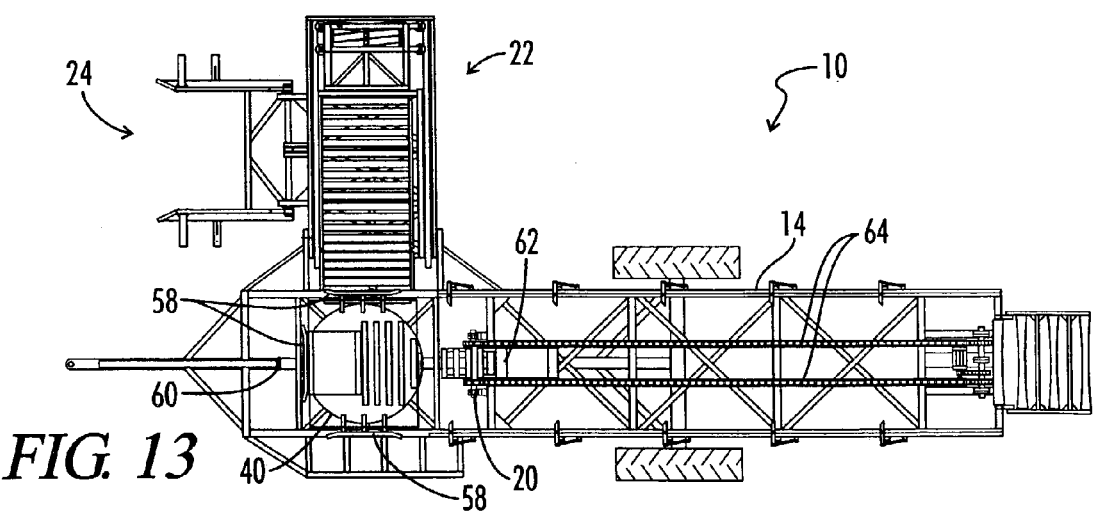
FIG. 13 is a top view similar to FIGS. 11 and 12.
Figure 14:
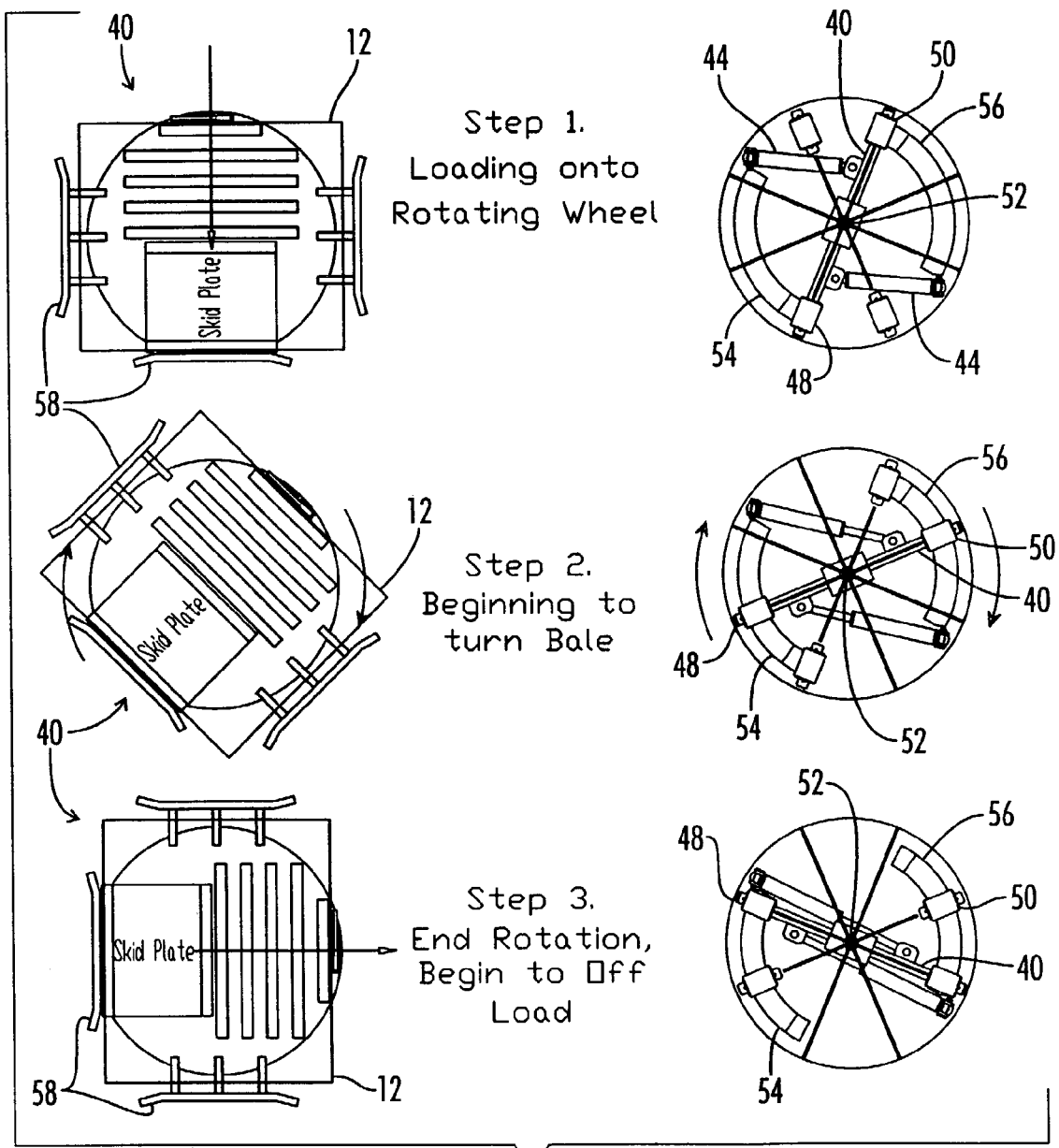
FIG. 14 is a series of isolated views showing the rotational transfer platform.

Once the hay bales 12 reach the transfer platform 40, the transfer platform 40 rotates at least ninety (90) degrees, thereby changing the orientation of the hay bales 12 with respect to the trailer frame 14. This rotation of the hay bales 12 is designed to facilitate increased capacity on the apparatus 10. As seen in FIG. 11, the transfer platform 40 faces the loading system 22 to accept the hay bales 12. As the loading system 22 moves the hay bales 12 to the transfer platform 40, the transfer platform 40 accepts the hay bales 12. The transfer platform 40 is rotated by the plurality of rotational devices 44.

The rotational devices 44 include piston cylinders 44 attached to a center axis rod 46 which includes two roller ends 48 and 50. These piston cylinders 44 extend causing the center axis rod 46 to rotate about center point 52. Roller ends 48 and 50 arc through roller channels 54 and 56 to maintain the rotational movement of the transfer platform 40. The combination of the roller ends 48 and 50 and the roller channels 54 and 56 combine to raise the transfer platform 40 to an increased height level as the transfer platform 40 rotates through its arc. This raised height allows for a more efficient transfer of the hay bales 12 to the conveyor device 20. The plurality of rotational devices 44 can also include a rotational drive shaft affixed to the center point 52 of the center axis rod 46 or other standard rotational devices known in the industry and still maintain the inventive integrity of this invention.

Figure 15:
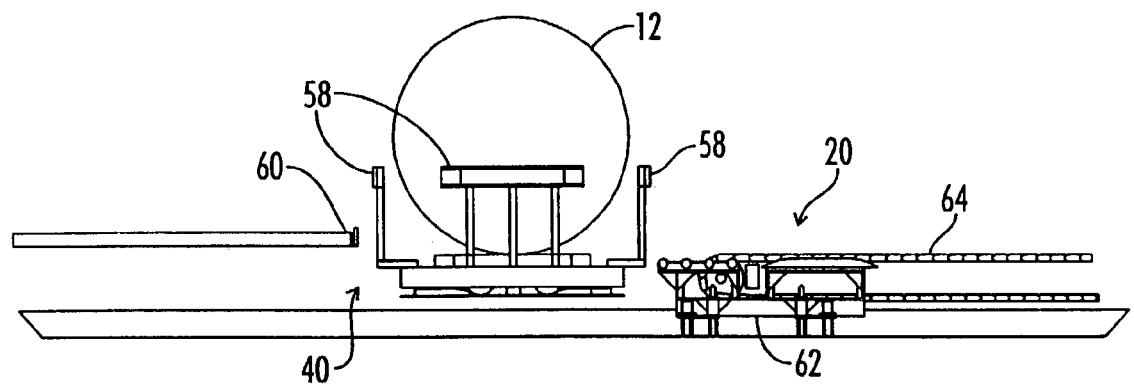
FIG. 15 is an isolated view of the rotational transfer platform, a hay bale, and the transfer of the hay bale off the rotational transfer platform and onto the conveyor device.
Figure 16:
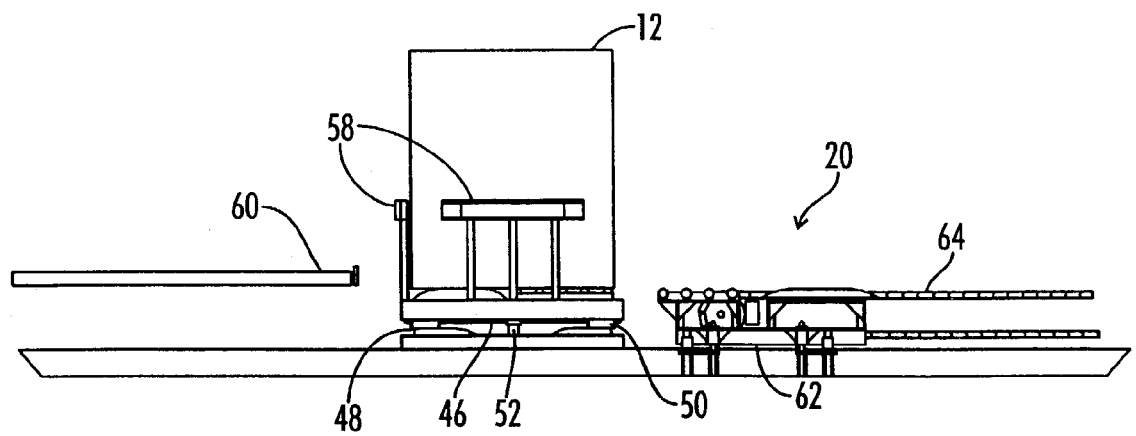
FIG. 16 is an isolated view similar to FIG. 15.
Figure 17:
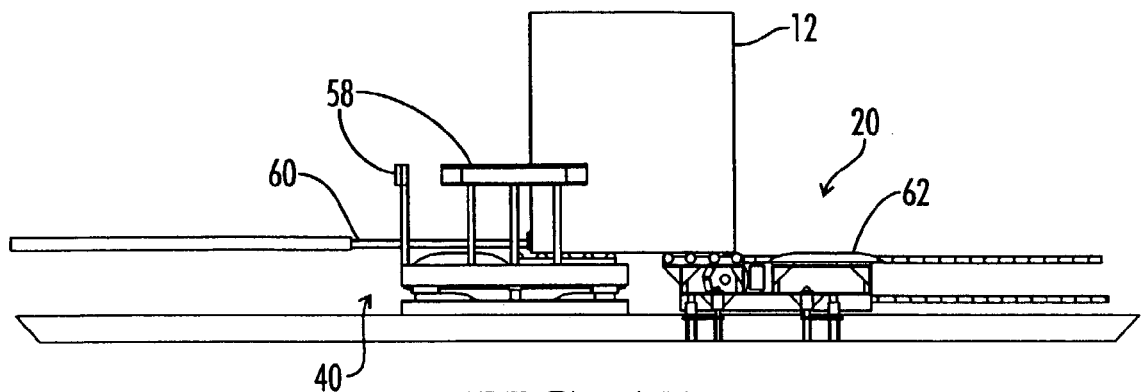
FIG. 17 is an isolated side view similar to FIGS. 15 and 16.
Figure 18:
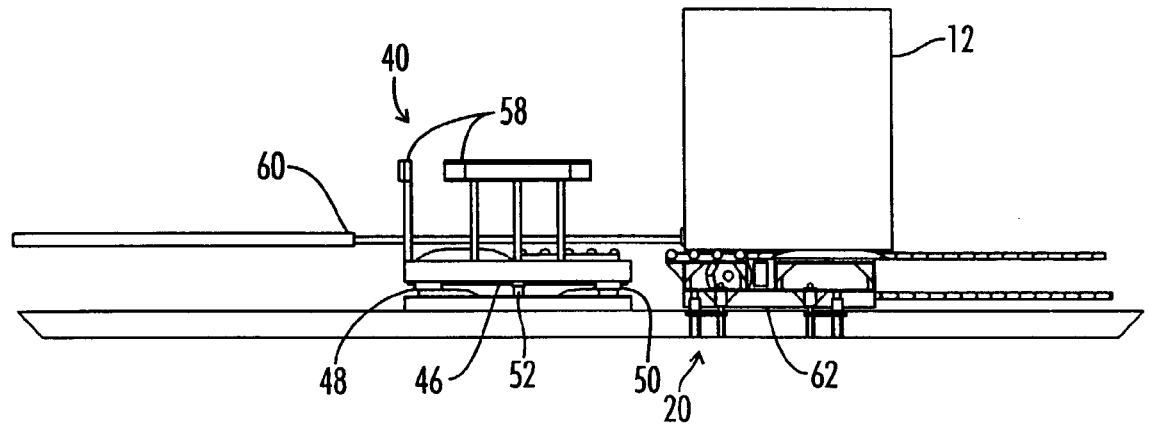
FIG. 18 is an isolated view similar to FIGS. 15 through 17.
Figure 19:
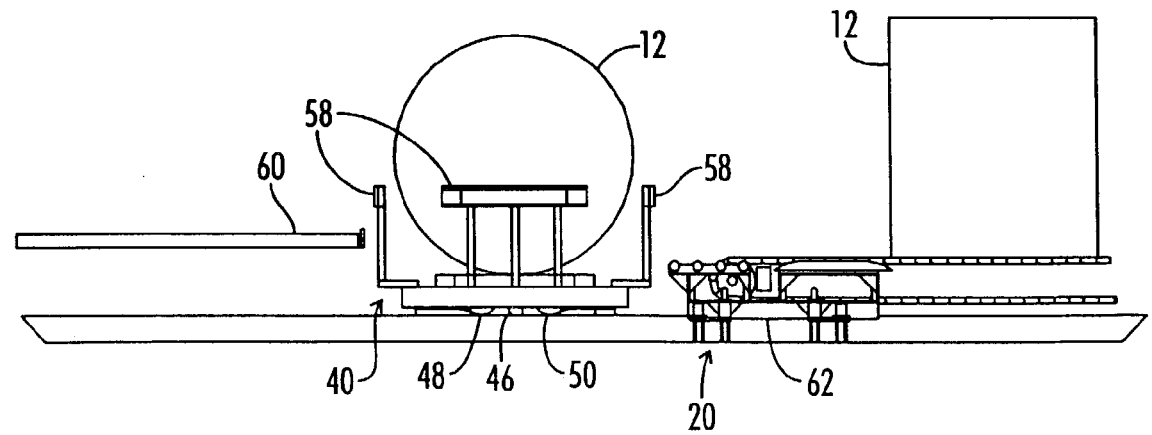
FIG. 19 is an isolated side view similar to FIGS. 15 through 18.
Figure 20:
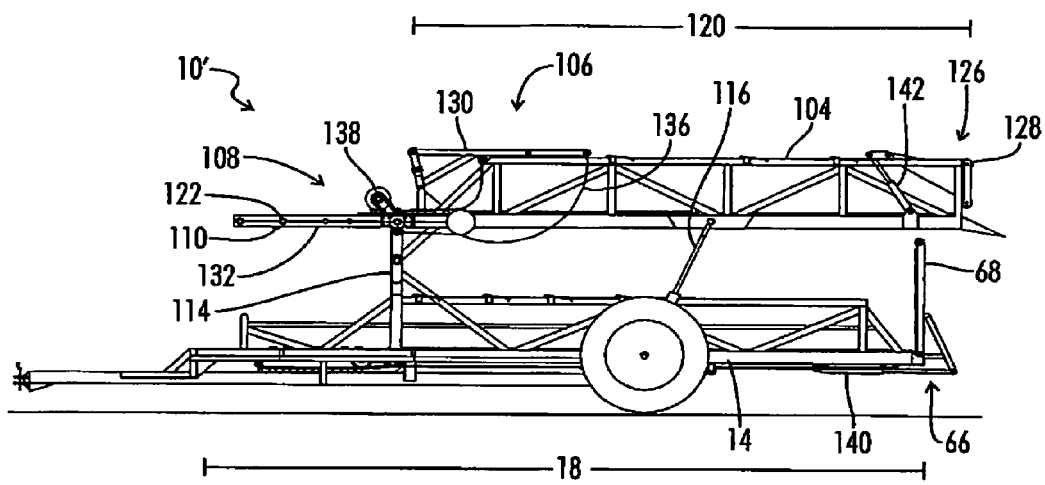
FIG. 20 is a side view of an apparatus of the current invention shown with a base trailer frame and a top trailer frame.
Figure 21:
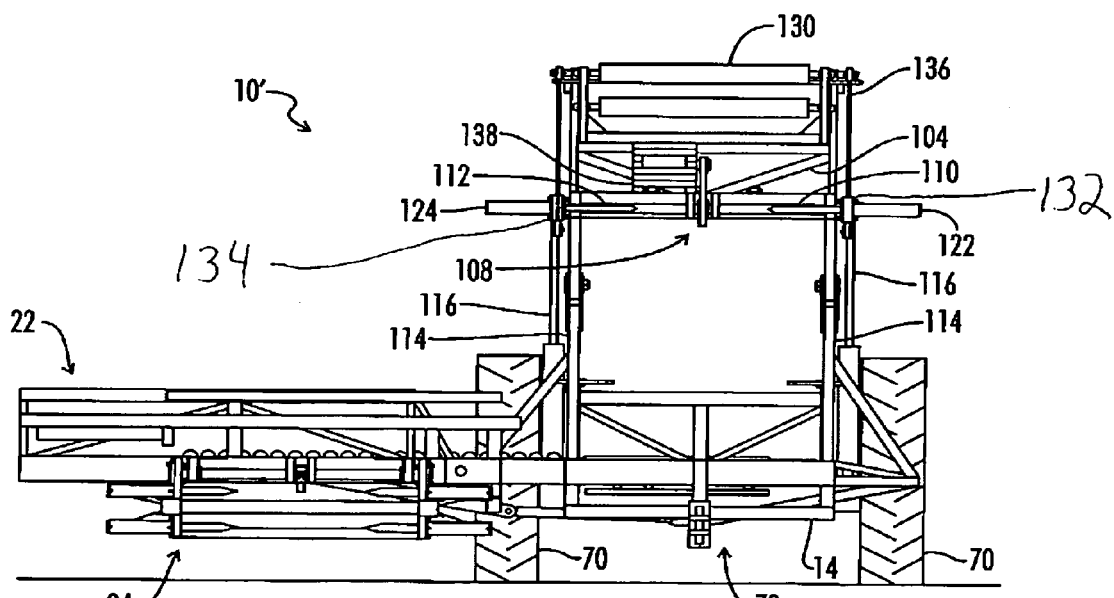
FIG. 21 is a front view of an apparatus of the current invention shown with a base trailer frame and a top trailer frame.

As seen in FIG. 15, the transfer platform 40 is shown with guide rails 58 used to direct the hay bales 12 onto the transfer platform 40 and to keep the hay bales 12 from extending off the transfer platform 40 in an untimely manner.

Once the transfer platform 40 rotates ninety degrees to align with the conveyor device 20, a push cylinder 60 engages the hay bale 12 and moves the hay bale 12 to the conveyor device 20. The push cylinder 60 then retreats back to its original position, as the conveyor device 20 indexes the hay bale 12 towards the loading end 38 of the trailer frame 14. Then the rotational devices 44 retract causing the transfer platform 40 to rotate back in alignment with the loading system 22 to accept another hay bale 12.

The conveyor device 20 includes a receiving frame 62 designed to raise above the conveyor track 64 in order to accept the hay bales 12 as the push cylinder 60 moves the hay bales 12 off the transfer platform 40. Once the hay bales 12 are fully moved to the receiving frame 62, the receiving frame 62 drops below the level of the conveyor track 64 to allow the conveyor track 64 to move the hay bales 12 towards the loading end 38 of trailer frame 14.

The trailer frame 14 includes an unloading end 66 and a rear gate 68. Pivotally attached to the unloading end 66 and positioned to release the hay bales 12 as the hay bales 12 approach the unloading 66 of the trailer frame 14. The trailer frame 14 includes a plurality of tires 70 positioned to support the weight of the apparatus 10 and the hay bales 12. The unloading end 66 of the trailer frame 14 includes an unloading cylinder 74 attached to the rear gate 68 and designed to raise and lower the rear gate 68 to allow hay bales 12 to exit the trailer frame 14.

Also, the trailer frame 14 includes an attachment area 72 designed to connect with a vehicle (not shown) in order for the vehicle to transport the apparatus 10. The trailer frame 14 also includes the hydraulic or electrical connections (not shown) needed to operate the mechanical features of the apparatus 10. The hydraulic and electrical connections traverse the attachment areas 72 to connect with the vehicle used to transport the apparatus 10. The trailer frame 14 includes a connection neck 102 designed to interact with a vehicle, such as a tractor or truck, in order to transport the apparatus 10. The connection neck 102, which can also be described as a tongue 102, a trailer hitch 102, or a gooseneck hitch 102, can include numerous designs and shapes known in the art to facilitate engagement between a vehicle and a trailer. For example, but not by way of limitation, the connection neck 102 can be designed to connect to a tractor, to a standard pickup truck, or have a "gooseneck" shape to engage vehicles designed to accept the "gooseneck" connection.

The trailer frame 14 also includes a plurality of indexing members 76 located along the length 18 of the trailer frame 14. The indexing members 76 are used to facilitate the individual locations of the hay bales 12 as the hay bales are loaded on the apparatus 10. These indexing members 76 also help secure the hay bales 12 as the hay bales 12 are being transported on the apparatus 10.

The conveyor device 20 indexes each hay bale 12 back along the length 18 of the trailer frame 14 to allow a new hay bale 12 to be placed on the conveyor device 20. The indexing is facilitated through the use of a plurality of conveyor tracks 64 positioned to engage the hay bales 12 and transport the hay bales 12 the majority of the length 18 of the trailer frame 14. These conveyor tracks 64 include, but not limited to, slat type conveyor tracks, smooth plated chain conveyor tracks, roller conveyor tracks, and other types of conveyor tracks known in the art to transport items from one location to the next.

The conveyor device 20 also includes a drive device 78 positioned to engage and rotate the conveyor tracks 64. In a preferred embodiment, the drive device 78 is an engine located near the unloading end 66 of the trailer frame 14. This drive device 78 transfers the conveyor tracks 64 along the length 18 of the trailer frame 14 and connects to the carrier track 42 of the transfer platform 40. The drive device 78 powers the carrier track 42 to move the hay bales 12 to the conveyor tracks 64 of the conveyor device 20. The engagement between the drive device 78 and the conveyor track 64 can be accomplished by numerous methods known in the art to convert energy into transitional or rotational motion, including, but not limited to, gears, sprockets, chain drives, pistons, and the like.

The movement deck 22, also known as a roller deck 22 or a roller conveyor 22, includes a mechanical movement device 80 positioned on the movement deck 26 to direct the hay bales 12 onto the trailer frame 14. The mechanical movement device 80, which can also be called a plurality of rollers 80, can comprise numerous forms of devices designed to facilitate movement of heavy objects across a substantially flat surface. The mechanical movement device 80 is positioned to engage the hay bales 12 and carry the hay bales 12 to the trailer frame 14. The mechanical movement device 80 has a width that corresponds at least to the width of the hay bales 12 and a length that corresponds to at least the length of the hay bales 12.

The movement arm 28 includes a scissor type pushing ram 82 designed to move the hay bales 12 to the trailer frame 14 across the mechanical moving device 80 of the movement deck 26. The scissor type pushing ram 82 includes a plurality of guide rollers designed to engage a portion of the loading system frame 86 and to maintain a consistent direction for which the scissor type pushing ram 82 engages the hay bales 12.

Figure 8:
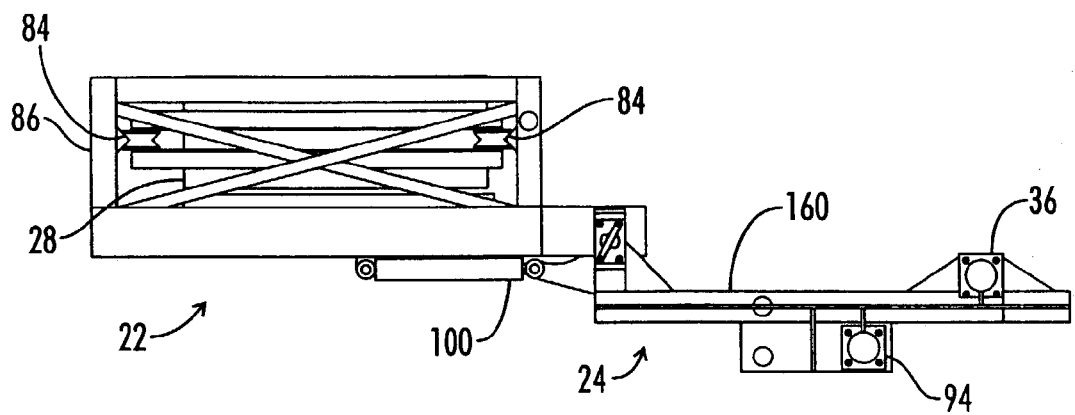
FIG. 8 is an isolated side view of the hay bale retrieving device and the movement arm.
Figure 9:
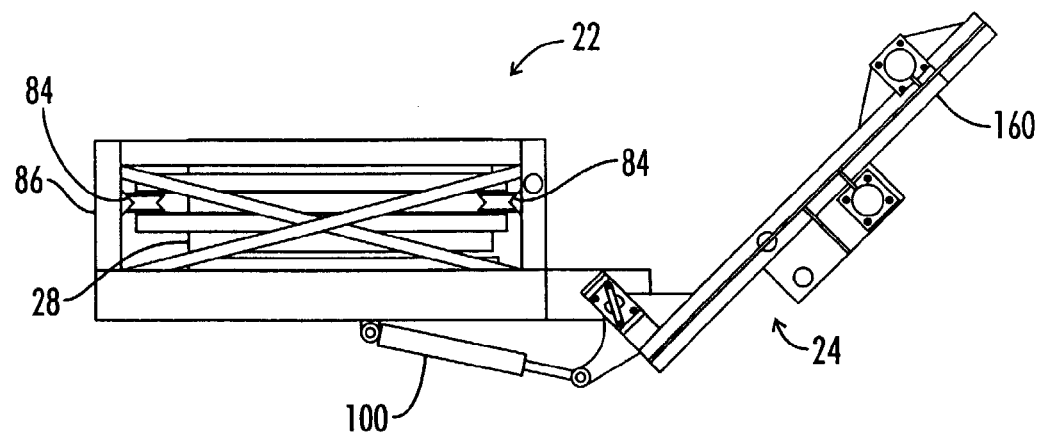
FIG. 9 is an isolated side view similar to FIG. 8.
Figure 10:
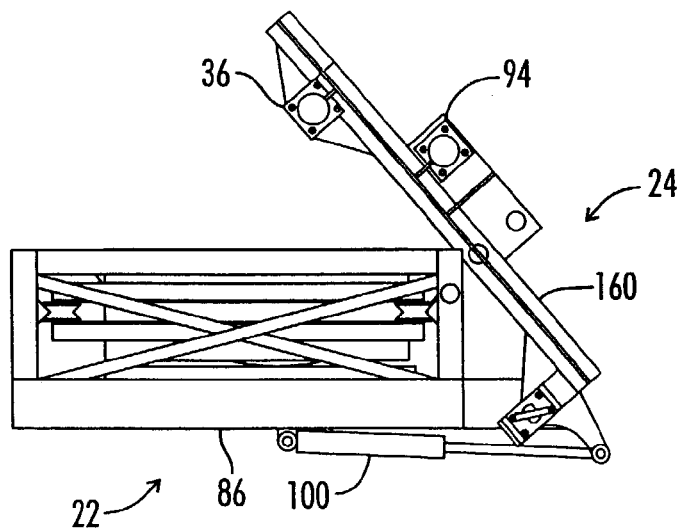
FIG. 10 is an isolated side view similar to FIGS. 8 and 9.

The hay bale retrieving device 24 is pivotally attached to the loading system 22 and has a rotational axis perpendicular to the first side 16 of the trailer frame 14. Specifically, the hay bale retrieving device 24 is attached to the loading system frame 86 and the hay bale retrieving device 24 rotates in a semicircle arc upward once the first spike 30 and second spike 32 impale a hay bale 12. As seen in FIGS. 8–10, the hay bale retrieving device 24 rotates through an arc that begins at a position parallel to the ground and ends at a position such that the first and second spikes 30 and 32 are positioned over the loading system 22. In a preferred embodiment, the hay bale retrieving device 24 includes third spike 88 and fourth spike 90 which impale the hay bales 12 through additional pistons 92 and 94. The spikes 30, 32, 88, and 90 lift the hay bales 12 onto the loading system 22.

The hay bale retrieving device 24 includes a first loading arm 160 attached to the first spike 30 and a second loading arm 162 attached to the second spike 32, wherein movement of the first loading arm 160 and second loading arm 162 loads the hay bale 12 onto the loading system 22.

The hay bale retrieving device 24 includes an indicating bar 144 positioned on the hay bale retrieving device 24 to indicate to a user of the apparatus 10 that a hay bale 12 is located within the retrieving device 24. In a preferred embodiment the indicating bar 144 is a bump bar 144 designed to engage the hay bale 12 and signal to a user of the apparatus 10 the presence of a hay bale 12 within the hay bale retrieving device 24.

Figure 5:
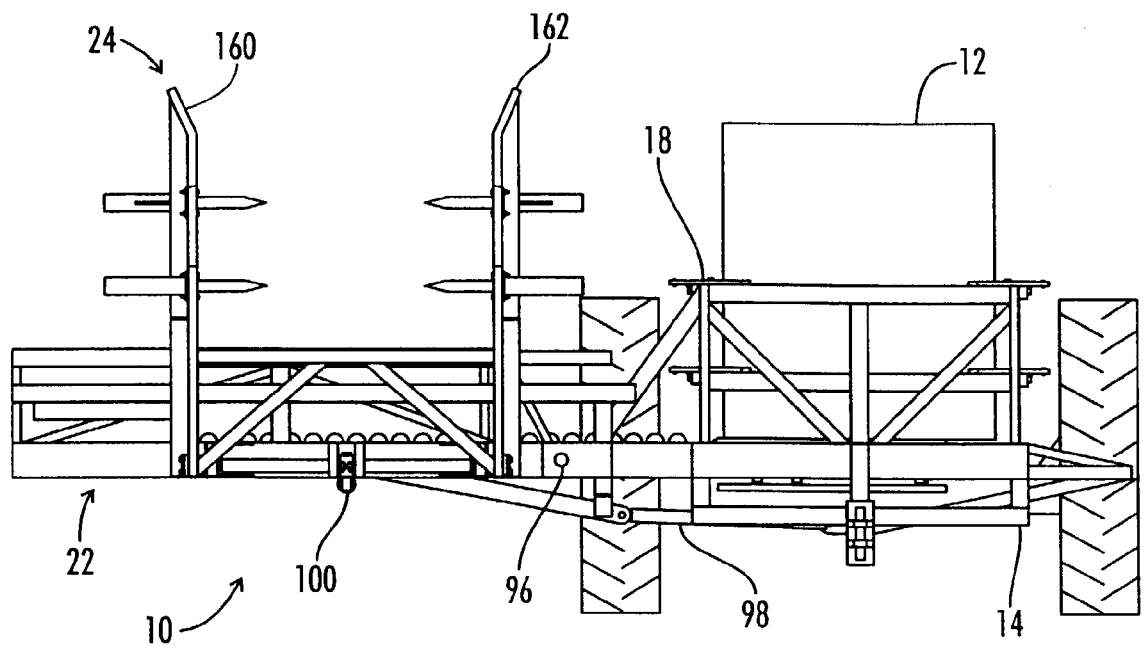
FIG. 5 is a front view of an apparatus of the present invention shown with the hay bale retrieving device raised to commence the transformation of the apparatus into the transport position.
Figure 6:
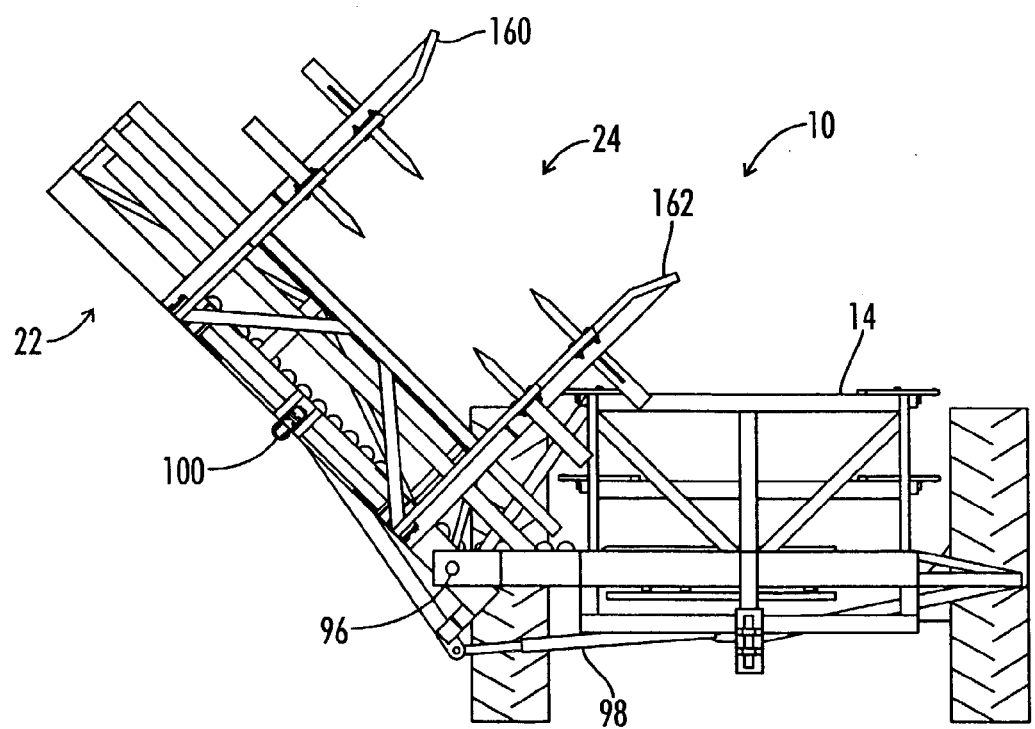
FIG. 6 is a front view of the apparatus similar to FIGS. 5.
Figure 7:
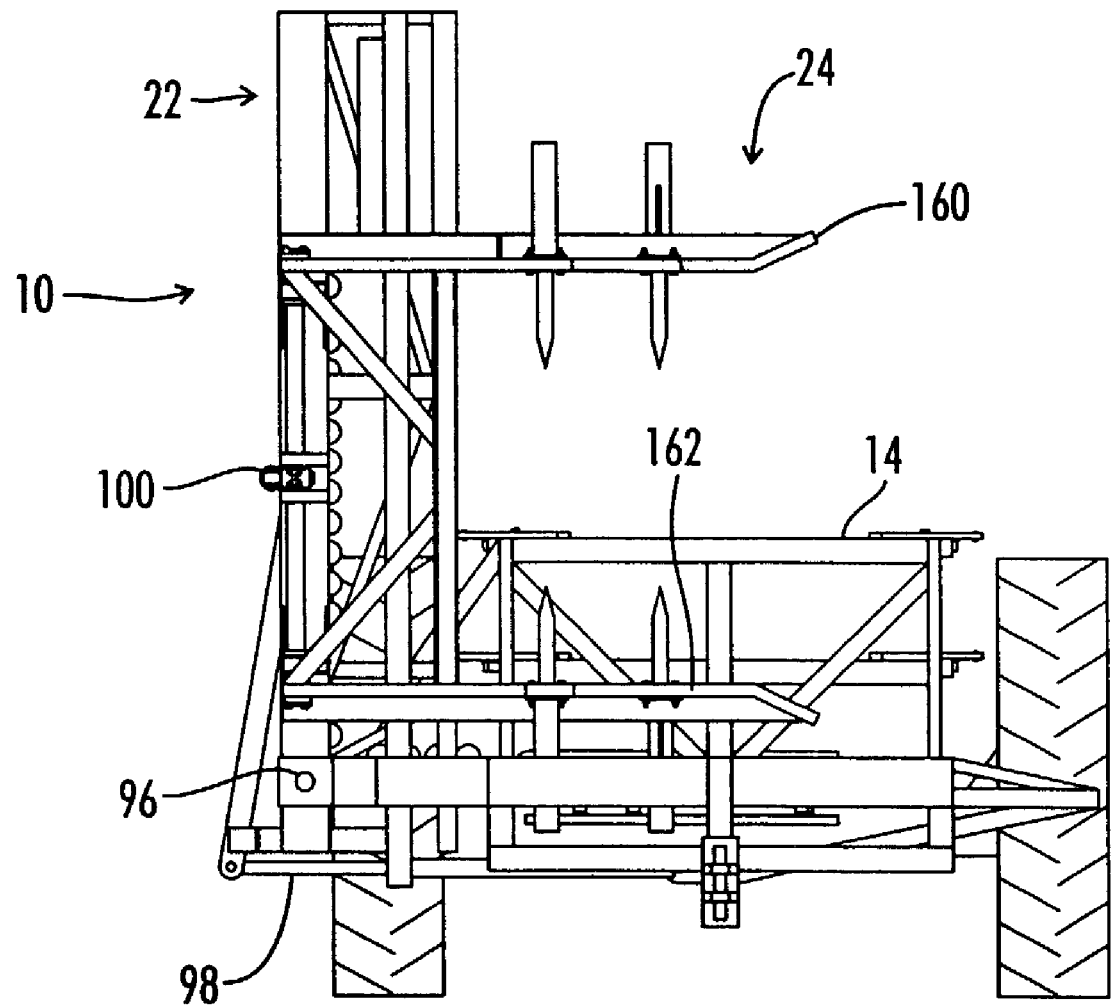
FIG. 7 is a front view of the apparatus similar to FIGS. 5 and 6.

A unique feature of the apparatus 10 is the fact that the loading system 22 is pivotally attached to the first side 16 of the trailer frame 14 and includes an axis of rotation 96 parallel to the first side 16 of the trailer frame 14. The loading system 22 is positioned to rotate about the axis of rotation 96 from a horizontal position to a vertical position as seen in FIGS. 5–7. This rotation allows the loading system 22 and the hay bale retrieving device 24 to move to a transport position as seen in FIGS. 2 and 7. This transport position allows the apparatus 10 to be easily maneuvered from one location to the next in order to facilitate loading and unloading of the apparatus 10. This transport position results in the loading system 22 and the hay bale retrieving device 24 to be contained within the footprint area of the trailer frame 14 during transportation of the apparatus 10. This rotational movement is facilitated by a transitional piston 98 located underneath the loading system 22 and trailer frame 14 and engaging both the loading system 22 and trailer frame 14.

The movement of the hay bale retrieving device 24 is facilitated through a loading piston 100 engaging both the loading system frame 86 and the hay bale retrieving device 24. The loading piston 100 is positioned beneath the loading system 22, and, when activated, rotates the hay bale retrieving device 24 in a semicircle arc to raise the hay bale 12 onto the movement deck 26. Once the hay bale retrieving device 24 has rotated to position the hay bales 12 over the moving deck 26, the first piston 34 and second piston 36 activate to remove the first spike 30 and second spike 32 from the hay bale 12. This action releases the hay bale 12 down to the movement deck 26 where the movement deck 26 and the movement arm 28 can facilitate movement of the hay bale 12 to the trailer frame 14.

The apparatus 10' for loading, transporting, and unloading hay bales 12 can also be described as comprising a base trailer frame 14 that includes a base loading end 38, a first side 16, and a base length 18, a top trailer frame 104 attached to the base trailer frame 14 and including a top loading end 106, a conveyor device 20 attached to the base trailer frame 14 and positioned to transport the hay bales 12 a majority of the base length 18, a loading system 22 attached to the first side 16 of the base trailer frame 14, a hay bale retrieving device 24 pivotally attached to the loading system 22, and a lifting system 108 attached to the top loading end 106. The top trailer frame 104 includes a top length 120 that is shorter than the base length 18.

The retrieving device 24 includes a first base spike 30 and second base spike 32 positioned opposed to the first base spike 30, wherein both base spikes 30 and 32 are positioned to engage the hay bales 12 and lift the hay bales 12 onto the movement deck 26 of the loading system 22. The lifting system 108 includes a first top spike 110 and a second top spike 112 positioned opposed to the first top spike 110, wherein both top spikes 110 and 112 are positioned to engage the hay bales 12 and lift the hay bales 12 onto the top trailer frame 104.

This apparatus 10' further includes plurality of stanchions 114 attached to the top loading end 106 and the base-loading end 38. The stanchions 114 are positioned to space the top trailer frame 104 from the base trailer frame 14. The stanchions 114 provide support for and facilitate the placement of the top trailer frame 104 relative to the base trailer frame 114.

Also, a plurality of location pistons 116 engages the base trailer frame 14 and the top trailer frame 104. The location pistons 116 are positioned to vary the location of the top trailer frame 104 relative to the base trailer frame 14. The location pistons 116 are positioned distal from the base loading end 38 and the top loading end 106. The location pistons 116 are designed to lower and raise the top unloading end 126 of the top trailer frame 104 in order to facilitate the unloading of the hay bales 12 from the top trailer frame 104.

The base trailer frame 14 includes a transfer platform 40 attached to the base loading end 38, a base unloading end 66, and a base rear gate 68. The transform platform 40 includes a carrier track 42 positioned to transfer the hay bales 12 to the conveyor device 20. The base rear gate 68 is pivotally attached to the base unloading end 66 and is positioned to release the hay bales 12 as the hay bales 12 approach the base unloading end 66.

The apparatus 10' further includes a third piston 122 attached to the first top spike 110 and a fourth piston 124 attached to the second top spike 112, wherein the third and fourth pistons 122 and 124 are positioned to removably impale the first and second top spikes 110 and 112 into the hay bales 12.

The top trailer frame 104 includes a top unloading end 126 and a top rear gate 128 pivotally attached to the top unloading end 126 and positioned to release the hay bales 12 as the hay bales 12 approach the top unloading end 126 of the top trailer frame 104.

The apparatus 10' is designed to load hay bales 12 on the base trailer frame 14 then to load hay bales 12 from the transfer platform 40 of the base trailer frame 14 onto the top trailer frame 104. The top trailer frame 104 includes a top front gate 130 positioned near the top loading end 106 of the top trailer frame 104. The top front gate 130 is positioned to retain hay bales 12 that are loaded onto the top trailer frame 104 from departing the top loading end 106 of the top trailer frame 104.

Figure 22:
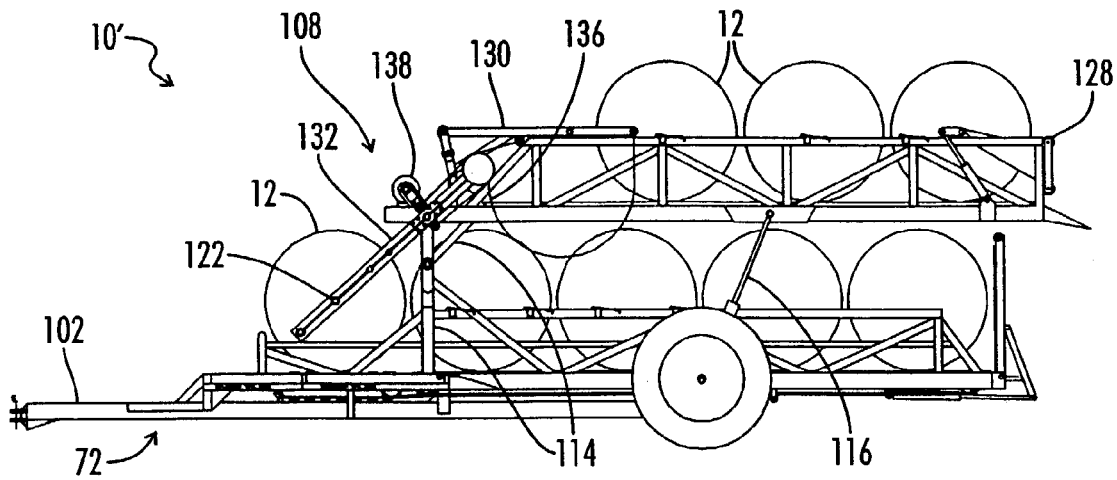
FIG. 22 is a side view of the apparatus shown in FIG. 20. This view shows the lifting system engaging a hay bale and commencing to move the hay bale to the top trailer frame.
Figure 23:
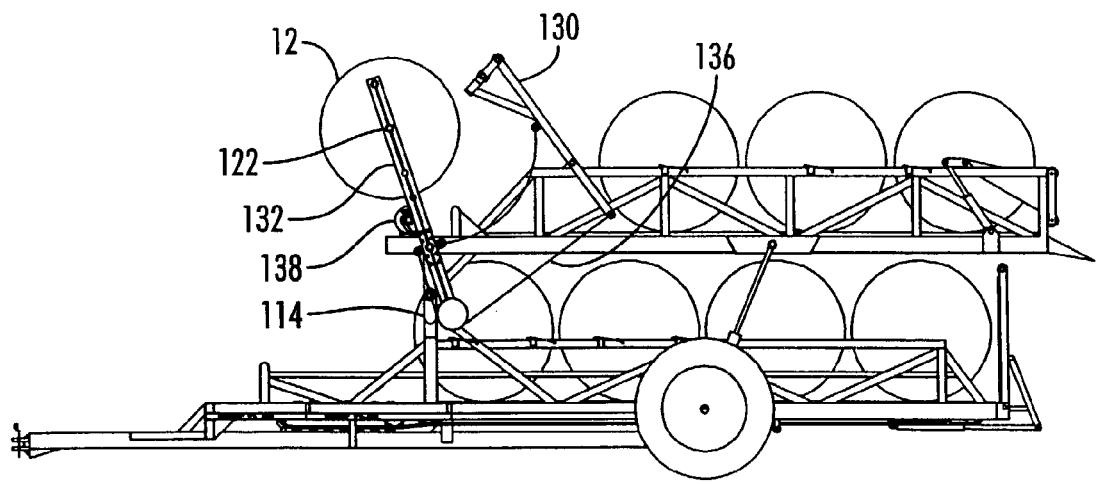
FIG. 23 is a side view similar to FIG. 22.

The lifting system 108 includes a first lifting arm 132 attached to the first top spike 110, a second lifting arm 134 attached to the second top spike 112, and a cable 136 attached to the first lifting arm 132 and the top front gate 130, wherein movement of the first lifting arm 132 opens the top front gate 130. The top front gate 130 is pivotally attached to the top trailer frame 104, so that force applied to the top front gate 130 by the cable 136 causes the top front gate 130 to open and allow placement of a hay bale 12 onto the top trailer frame 104 as seen in FIGS. 22 and 23. The lifting system 108 includes a motor 138 engaging the first lifting arm 32 and second lifting arm 34 to raise the first and second lifting arms 132 and 134.

The first and second lifting arms 132 and 134 engage the first top spike 110 and second top spike 112 as well as the third piston 122 and fourth piston 124. The third piston 122 and the fourth piston 124 impale the first top spike 110 and second top spike 112 into the hay bales 12. Once the hay bales 12 are secured, the motor 138 activates to raise the first lifting arm 132 and second lifting arm 134 in order to raise the hay bales 12 up to a height which the hay bales 12 can be loaded onto the top trailer frame 104. The interaction between the motor 138 and the lifting arms 132 and 134 can be accomplished by numerous techniques known in the art to connect a motor to lifting elements.

Figure 24:
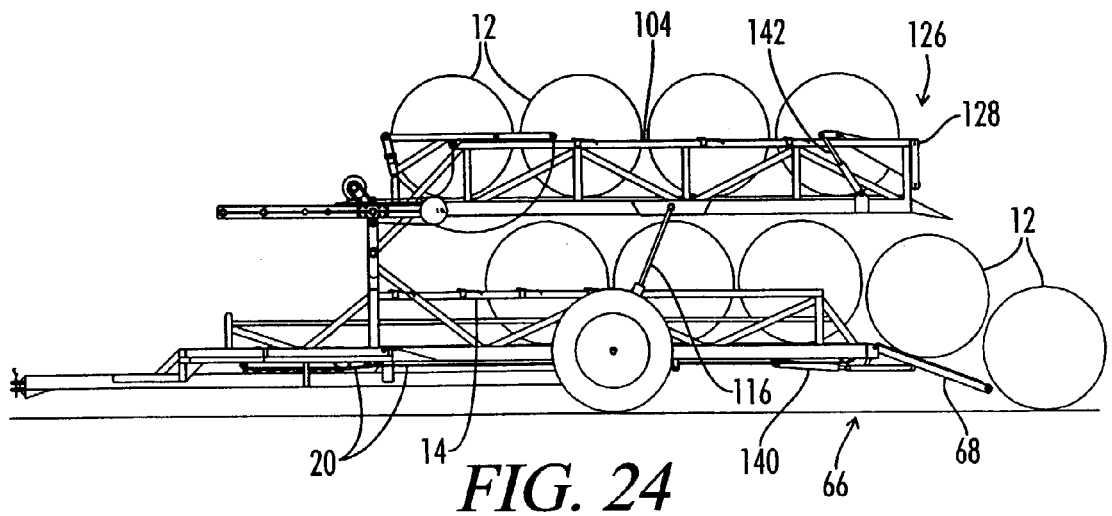
FIG. 24 is a side view of the embodiment of the invention depicted in FIG. 20.
Figure 25:
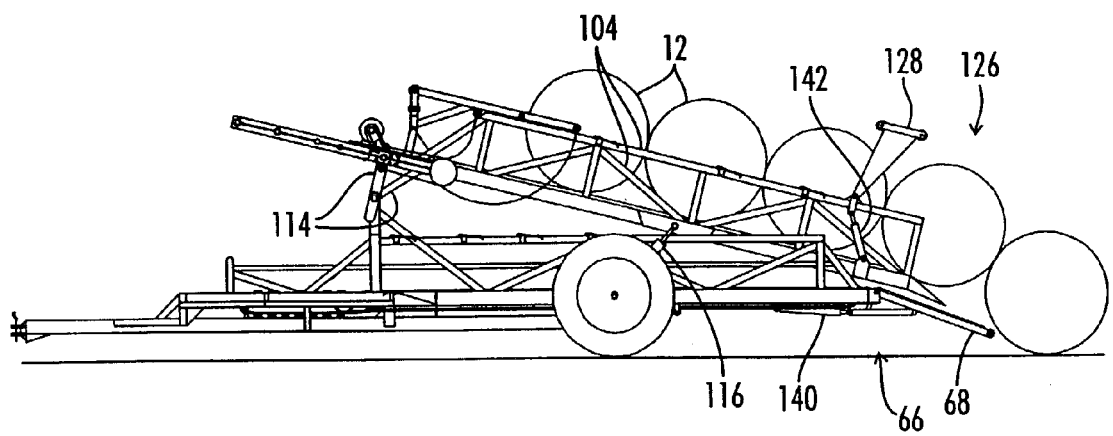
FIG. 25 is a side view similar to FIG. 24.
Figure 26:
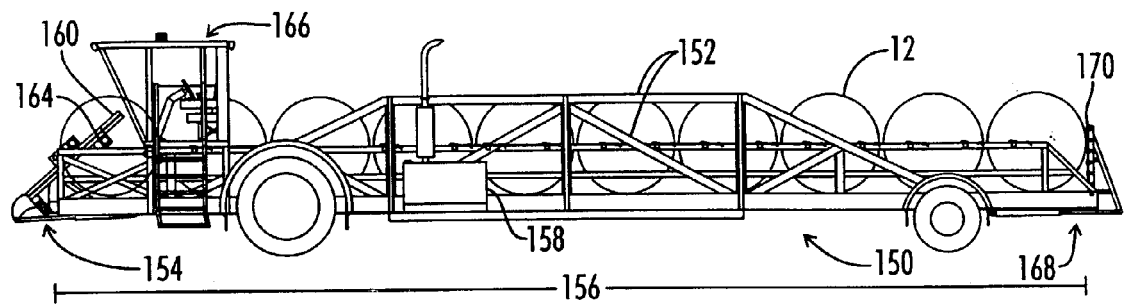
FIG. 26 is a side view of a vehicle of the current invention.
Figure 27:
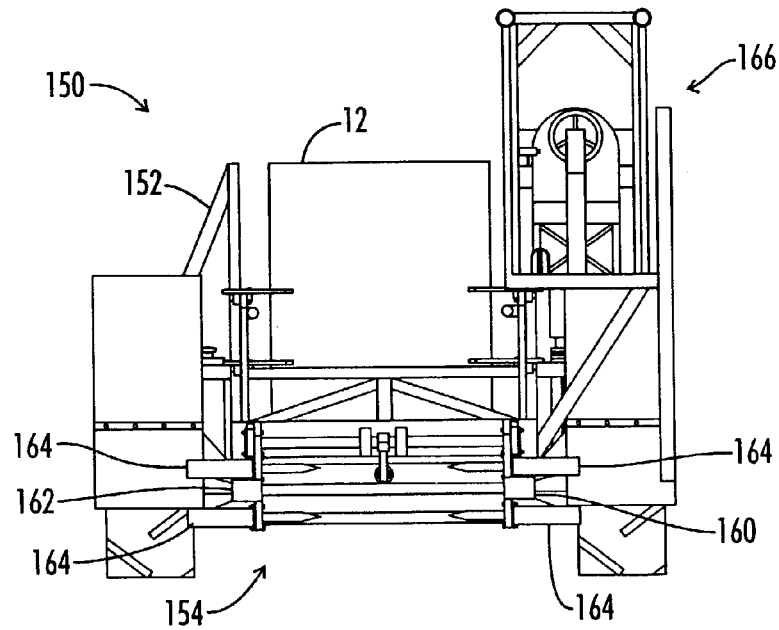
FIG. 27 is a front view of the vehicle of the current invention.
Figure 28:
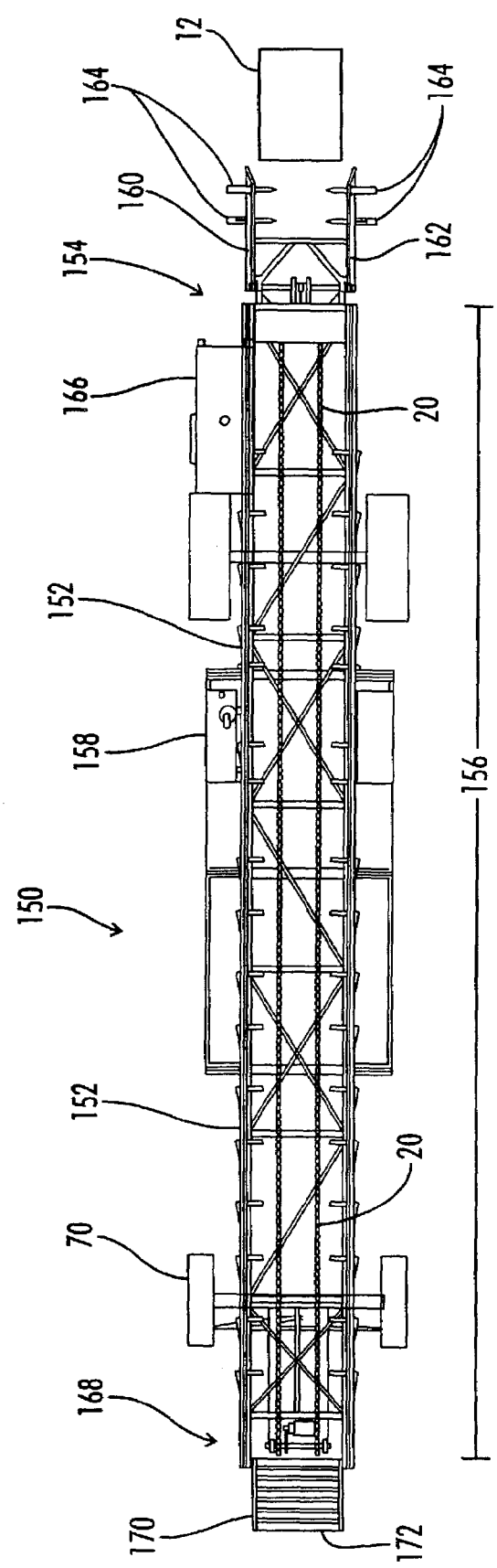
FIG. 28 is a top view of the vehicle of the current invention approaching a hay bale.

When it is desired for the hay bales 12 to be unloaded from the apparatus 10', the base rear gate 68 is lowered with the use of a rear gate piston 140 as seen in FIG. 24. The conveyor device 20 is then activated to unload the hay bales 12 on the base trailer frame 14. Once all of the hay bales 12 are unloaded from the base trailer frame 14, the location pistons 116 are activated to lower the top trailer frame 104 to a position to where the hay bales 12 that are on the top trailer frame 104 can be unloaded, as seen in FIG. 25. The top rear gate 128 is then opened by the activation of the top rear gate piston 142 to allow the hay bales 12 to unload from the top trailer frame 104.

A vehicle 150 for loading, transporting, and unloading hay bales 12 is also disclosed. The vehicle 150, also described as a tractor model 150, comprises a vehicle frame 152 including a vehicle loading end 154 and a vehicle length 156, an engine 158 attached to the vehicle frame 152, a conveyor device 20 attached to the vehicle frame 152, and a hay bale retrieving device 24 pivotally attached to the vehicle loading end 154. The conveyor device 20 is positioned on the vehicle frame 152 to transport the hay bales 12 a majority of the vehicle length 156. The hay bale retrieving device 24 includes a first spike 30 and a second spike 32 positioned opposed to the first spike 30. Both spikes 30 and 32 are positioned to engage the hay bales 12 and lift the hay bales 12 onto the vehicle frame 152.

The hay bale retrieving device 24 of the vehicle 150 further includes a first loading arm 160 connecting the vehicle loading end 154 and the first spike 30. The hay bale retrieving device also includes a second loading arm 162 connecting the vehicle loading end 154 and the second spike 32. Hay bale retrieving device is located extending from the vehicle loading end 154 of the vehicle 150. The location allows user of the vehicle 150 to easily align with, engage, and load hay bales 12 onto the vehicle 150.

The hay bale retrieving device 24 is manipulated in a semicircular arc in order to load the hay bales 12 onto the vehicle frame 152. In a preferred embodiment this manipulation is accomplished through loading pistons 164 connecting the first loading arm 160 and second loading arm 162 to the vehicle frame 152.

The vehicle 150 further includes a control station 166 attached to the vehicle frame 152 near the vehicle loading end 154. The control station 166 operatively engages the engine 158, the conveyor device 20, and the hay bale retrieving device 24. The control station 166 is designed to provide for a user (not shown) of the vehicle 150 to operate the vehicle from within the spatial parameters of the control station 166.

The vehicle 150 further includes a first piston 34 attached to the first spike 30 and second piston 36 attached to the second spike 32. The first and second pistons 34 and 36 are positioned to removably impale the first and second spikes 30 and 32 onto the hay bales 12. The first and second pistons 34 and 36 are attached to the first and second arms 160 and 162. In a preferred embodiment the vehicle 150 includes a third spike 88 and a fourth spike 90 and additional pistons 92 and 94 to increase the secured engagement between the hay bale retrieving device 24 and the hay bale 12 during the loading of the hay bale 12 onto the vehicle 150.

The conveyor device 20 of the vehicle 150 further includes a plurality of conveyor tracks 64 positioned on the vehicle frame 152 to engage the hay bales 12 and transport the hay bales 12 the majority of the vehicle length 156 of the vehicle frame 152.

The vehicle frame 152 includes a vehicle unloading end 168 and a vehicle rear gate 170 pivotally attached to the vehicle-unloading end 168. The vehicle rear gate 170 is positioned to release the hay bales 12 as the hay bales 12 approach the vehicle-unloading end 168. In a preferred embodiment, the vehicle rear gate 170 includes a plurality of rollers 172 to facilitate the movement of the hay bales 12 across the vehicle rear gate 170 and off the vehicle 150.

One of ordinary skill in the art will understand the dimensions and exact operation of any embodiment of the present invention may change to mirror the exact size and shapes of the hay bales that are to be loaded, transported, and unloaded. These changes would still be within the inventive spirit of the invention as thus disclosed.

Thus it is seen that the apparatus and methods of the present invention readily achieves the ends and advantages mentioned, as well as those inherent therein. While certain preferred embodiments of the invention have been illustrated and described for purposes of the present disclosure, numerous changes in the arrangement and construction of parts and steps may be made by those skilled in the art, which changes are encompasses within the scope and spirit of the present invention as defined by the appended claims. Although there have been described particular embodiments of the present invention of a new and useful Hay Bale Loader and Hauler, it is not intended that such references be construed as limitations upon the scope of this invention except as set forth in the appended claims.

What is claimed is:

1. An apparatus for loading, transporting, and unloading hay bales, comprising:
   a trailer frame including a first side and a length;
   a conveyor device attached to the trailer frame and positioned to transport the hay bales a majority of the length of the trailer frame;
   a loading system attached to the first side of the trailer frame and including a movement deck and a movement arm positioned to move the hay bales across the movement deck and to the trailer frame;
   a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;
   wherein the trailer frame includes a loading end and a transfer platform located near the loading end, the transfer platform including a carrier track positioned to transfer the hay bales to the conveyor device; and
   wherein the transfer platform further includes a plurality of rotational devices engaging the trailer frame and positioned to rotate the transfer platform relative to the trailer frame.

2. The apparatus of claim 1, wherein the trailer frame includes an unloading end and a rear gate pivotally attached to the unloading end and positioned to release the hay bales as the hay bales approach the unloading end of the trailer frame.

3. The apparatus of claim 1, wherein the conveyor device includes:
   a plurality of conveyor tracks positioned to engage the hay bales and transport the hay bales the majority of the length of the trailer frame; and
   a drive device positioned to engage and transfer the conveyor tracks.

4. The apparatus of claim 1, wherein the conveyor device includes a smooth plated chain conveyor.

5. The apparatus of claim 1, wherein the movement deck includes plurality of rollers positioned to engage the hay bales and transport the hay bales to the trailer frame.

6. An apparatus for loading, transporting, and unloading hay bales, comprising:
- a trailer frame including a first side and a length;
- a conveyor device attached to the trailer frame and positioned to transport the hay bales a majority of the length of the trailer frame;
- a loading system attached to the first side of the trailer frame and including a movement deck and a movement arm positioned to move the hay bales across the movement deck and to the trailer frame;
- a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales; and
- wherein the movement arm includes a scissor type pushing ram.

7. The apparatus of claim 6, wherein the trailer frame includes a loading end and a transfer platform located near the loading end, the transfer platform including a carrier track positioned to transfer the hay bales to the conveyor device.

8. The apparatus of claim 7, wherein the transfer platform further includes a plurality of rotational devices engaging the trailer frame and positioned to rotate the transfer platform relative to the trailer frame.

9. The apparatus of claim 6, wherein the trailer frame includes an unloading end and a rear gate pivotally attached to the unloading end and positioned to release the hay bales as the hay bales approach the unloading end of the trailer frame.

10. The apparatus of claim 6, wherein the conveyor device includes:
- a plurality of conveyor tracks positioned to engage the hay bales and transport the hay bales the majority of the length of the trailer frame; and
- a drive device positioned to engage and transfer the conveyor tracks.

11. The apparatus of claim 6, wherein the conveyor device includes a smooth plated chain conveyor.

12. The apparatus of claim 6, wherein the movement deck includes plurality of rollers positioned to engage the hay bales and transport the hay bales to the trailer frame.

13. An apparatus for loading, transporting, and unloading hay bales, comprising:
- a trailer frame including a first side and a length;
- a conveyor device attached to the trailer frame and positioned to transport the hay bales a majority of the length of the trailer frame;
- a loading system attached to the first side of the trailer frame and including a movement deck and a movement arm positioned to move the hay bales across the movement deck and to the trailer frame;
- a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales; and
- wherein the loading system is pivotally attached to the first side of the trailer frame, includes an axis of rotation parallel to the first side of the trailer frame, and is positioned to rotate about the axis of rotation from a horizontal position to a vertical position.

14. The apparatus of claim 13, wherein the trailer frame includes an unloading end and a rear gate pivotally attached to the unloading end and positioned to release the hay bales as the hay bales approach the unloading end of the trailer frame.

15. The apparatus of claim 13, wherein the conveyor device includes:
- a plurality of conveyor tracks positioned to engage the hay bales and transport the hay bales the majority of the length of the trailer frame; and
- a drive device positioned to engage and transfer the conveyor tracks.

16. The apparatus of claim 13, wherein the conveyor device includes a smooth plated chain conveyor.

17. The apparatus of claim 13, wherein the movement deck includes plurality of rollers positioned to engage the hay bales and transport the hay bales to the trailer frame.

18. The apparatus of claim 13, wherein the trailer frame includes a loading end and a transfer platform located near the loading end, the transfer platform including a carrier track positioned to transfer the hay bales to the conveyor device.

19. The apparatus of claim 18, wherein the transfer platform further includes a plurality of rotational devices engaging the trailer frame and positioned to rotate the transfer platform relative to the trailer frame.

* * * * *